July 25, 1939.   P. JACKSON ET AL   2,167,047
DOOR FOR BAKE OVENS
Filed Oct. 5, 1938

Inventors
Paul Jackson and
Arthur B. Cady
By
their Attorney

Patented July 25, 1939

UNITED STATES PATENT OFFICE 2,167,047

DOOR FOR BAKE OVENS

Paul Jackson and Arthur B. Cady, York, Pa., assignors to Read Machinery Company, Incorporated, York, Pa., a corporation of Pennsylvania Application October 5, 1938, Serial No. 233,442

3 Claims. (Cl. 107—65)

This invention relates to commercial bake ovens and more particularly to means associated with the doorways of such ovens to prevent infiltration of cold air into the oven with a consequent displacement of excessive amounts of moisture-laden air therefrom when the door is opened.

When bread is baked it gives off moisture equivalent to approximately ten percent of its weight and requires that additional moisture in the form of steam (at least ten pounds per 100 pounds of bread) be injected into the baking chamber during the baking operation. In order to maintain suitable baking conditions within the oven, these cumulative volumes of moisture together with the gases generated by the products being baked must be exhausted from the oven, usually through a steam outlet opening from the baking chamber and controlled by a damper.

When the door of the bake oven is open there is a tendency for a large volume of the heated moisture-laden air within the oven to rush out through the doorway and up through the steam outlet because of the higher pressure existing within the oven and also in consequence of the forceful displacement of such heated air by the cold air which bails into the oven through the lower section of the doorway. As a result not only is the temperature of the oven materially lowered but a substantial amount of moisture is lost through the doorway and the steam outlet by the influx of this cold air into the baking chamber, thus unfavorably affecting baking conditions within the oven. This is particularly true in the case of continuous feed ovens in which the door must remain open continuously or for relatively long intervals of time when loading or unloading loaves onto or from the traveling trays within the oven. The higher the doorway is located upon the oven the greater is the amount of oven air lost in this manner. While attempts have been made to overcome this difficulty by raising the level of the baking chamber relative to the door or by the installation of baffles designed to obstruct the flow of air through the doorway, neither of these expedients has proved wholly satisfactory in practice.

It is an important object of the present invention to obviate the above difficulty by providing means associated with the lower section of the oven doorway for discharging a curtain of air, or other suitable fluid, across the cross-section of the doorway, and more particularly across the lower section of the doorway through which the cold outside air tends to enter the oven. This air curtain is preferably discharged at sufficient velocity to prevent the outside atmosphere from entering the baking chamber when the door is opened but yet being such as to permit any excess amount of steam-laden air to exhaust itself through the upper section of the doorway into an offtake hood located immediately above the doorway.

A further object of our invention is to provide a mechanism of the above character in which said fluid curtain is rendered operative and inoperative by opening and closing the door of the oven.

A still further object of our invention is to provide a mechanism of the above character in which the means for producing the fluid curtain may be readily assembled with many of the well-known types of bake ovens of standard construction without altering to any substantial extent the structure of such ovens.

Other objects and advantages will be apparent from the following detailed description of a preferred embodiment of our invention, reference being had to the annexed drawing, in which.

Figure 1:
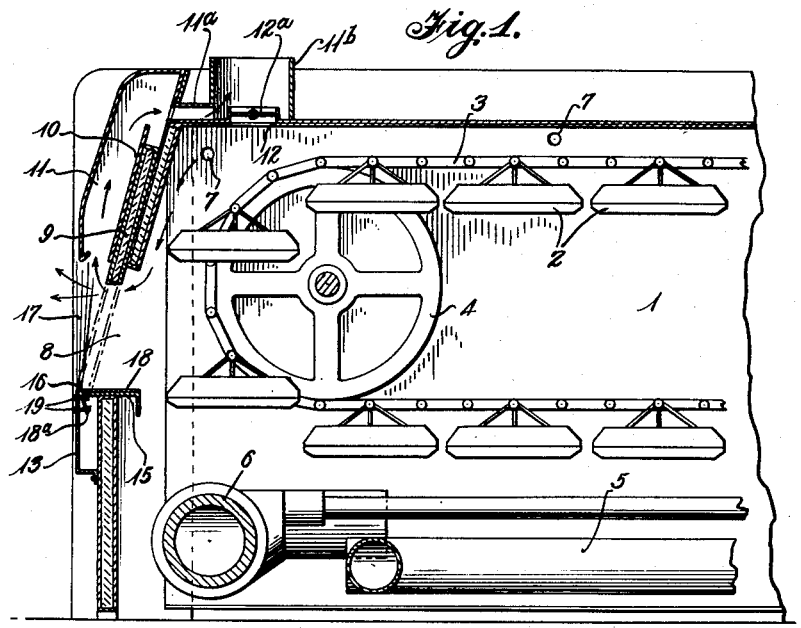
Figure 1 is a somewhat diagrammatic view in cross-section through one side and the forward end only of a commercial baking oven showing an air-chest associated with the doorway of the oven for producing an air curtain thereacross.

In Fig. 1 is shown in cross-section the forward end of one common form of commercial bake oven 1 suitable for the baking of bread, pies and pastry in conjunction with which the means for creating an air curtain forming the subject of this invention may be employed. This oven is of the continuous feed type and includes a series of trays 2 designed to hold loaves of bread or other products being baked, the trays being pivotally connected to a pair of endless chains 3 which extend between supporting sprockets 4 (only one sprocket being shown) at least one of which is driven by any suitable means to move the trays in an endless path through the baking chamber. Adjacent the bottom of the chamber is located a radiator type heating unit 5 which is supplied with hot fuel gases from a combustion chamber 6 which latter is in communication with the heating unit and adapted to be fired in any well-known manner. Steam is injected into the oven through spray pipes 7.

Opening through the front end of the bake oven is a doorway 8 adapted to be closed by a door 9 vertically slidable in guides 10. Immediately above the doorway is an offtake hood 11 extending the full width of the doorway, this hood being open at its lower end and communicating adjacent its upper end through a branch 11a with an upright offtake duct 11b venting to outside the building. A steam outlet 12 opening from the baking chamber into the offtake duct 11b and closed by a damper 12a permits the escape of excess moisture from the oven as well as of the gases produced by chemical changes in the goods being baked. The provision of a hood of this general nature for carrying off the hot air and gases escaping from the oven when the door is raised is common practice in the bake oven art.

Figure 2:
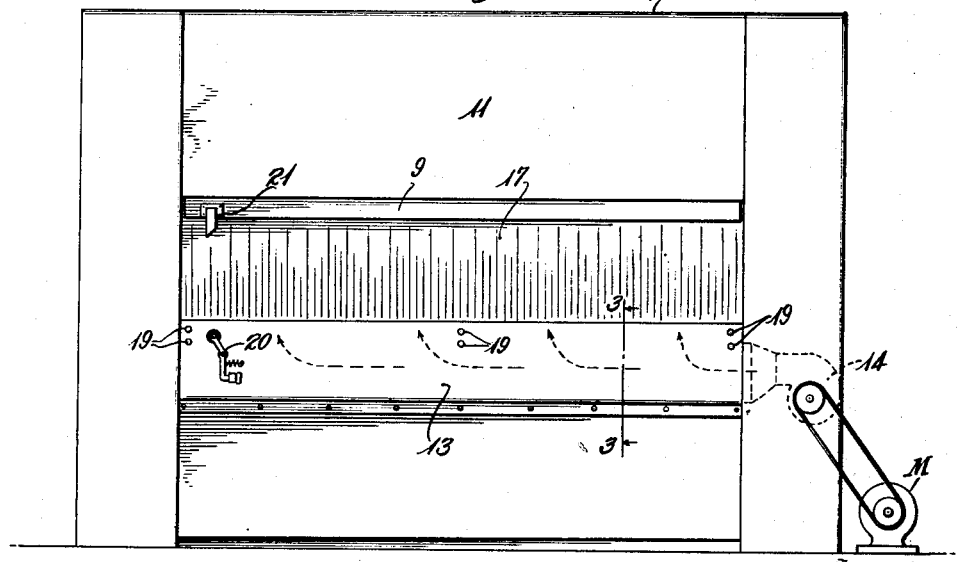
Figure 2 is a view in front elevation of the oven of Fig. 1.
Figure 3:
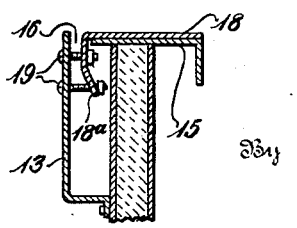
Figure 3 is a detail cross-sectional view through the wind-chest of Fig. 1 on the line 3—3 of Fig. 2.

Located on the front wall of the oven and adjacent the lower sill of the doorway 8 is an air-chest 13, one end of which is closed while the other end communicates with a source of fluid pressure, for example a small blower 14, as indicated by dotted lines in Fig. 2, operated by an electric motor M. This air-chest has its upper end closed by a metal sill plate 15 reinforcing the lower edge of the doorway. The outer side of the air-chest is spaced slightly from the forwardly projecting edge of the sill plate to provide a vent comprising a narrow slot 16 for the escape of air under pressure from the air-chest in the form of a continuous or substantially continuous curtain or screen as indicated at 17 in Fig. 1. This slot is preferably arranged to direct the current of air upwardly into the hood 11. A sheet metal plate 18 overlying and secured to the sill plate 15 is provided with a flange 18a directed downwardly into the slot and this flange is secured by bolts 19 to the side wall of the wind-chest in a manner such as to form with said wall a downwardly and outwardly flaring throat. By tightening or loosening the bolts 19, the front wall of the air-chest may be flexed to change the angle of discharge of the air curtain. A switch 20, conventionally represented in Fig. 2 on the outside of the air-chest, is interposed in an electric circuit (not shown) which includes the motor M. This switch is adapted to be normally maintained closed when the door is open so as to connect the motor with a source of electrical energy to operate the blower 14. The switch is engaged by a projection 21 on the door when the latter is fully lowered so as to open the switch and disconnect the motor, thus rendering the blower inoperative.

From the above description it will be apparent that when the door 8 is raised for loading or unloading the trays of the conveyor, the switch 20 closes to start the motor M. This motor starts the blower 14 which forces air into the wind-chest 13, which air discharges through slot 16 in the form of a curtain directed upwardly across the doorway as indicated at 17. The current of air forming the curtain is discharged at sufficient velocity to prevent cold air from surging into the oven through the lower section of the doorway and displacing a large volume of moisture-laden air therefrom which would unduly lower the temperature of the oven and reduce the humidity therein. However the velocity of the air current adjacent the upper section of the doorway is preferably such as to allow a certain amount of the oven air to escape therepast and enter the offtake hood 11, this arrangement being especially desirable in the case of continuous feed ovens in which the door is open continuously or over long periods of time for the introduction and removal of the goods onto and off of the trays in the oven and in which the open doorway supplements the steam outlet 12 to remove the excess of moisture-laden air and fumes from the baking chamber.

By virtue of the air curtain the proper temperature and humidity conditions within the oven are preserved regardless of the length of time the door may remain open. Furthermore the curtain insures better moisture and temperature control within the oven, increased fuel economy and greater ease and convenience on the part of the attendant in loading and unloading the trays.

It will be readily understood that the invention is applicable to bake ovens of various types and is not limited to use with ovens of the endless conveyor type described above. Nor is it essential that the air current be discharged from the air-chest through a slot to produce a curtain fulfilling the purpose of the invention, but the air, if desired, may be expelled through a series of closely spaced ports together composing the vent for producing the curtain. Various other means in place of the switch 20 may be alternatively employed for rendering the curtain operative.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

We claim:

1. The combination with a bake oven having a doorway extending between its interior and exterior and a door movable to open and close said doorway, of a source of fluid pressure and means associated with said source of fluid pressure and located adjacent the lower side of the doorway for directing a current of fluid in the form of a curtain upwardly and transversely of said doorway, said means being rendered operable by opening said door.

2. The combination with a bake oven having a doorway extending between its interior and exterior and a door movable to open and close said doorway, of a source of fluid pressure, a vent associated with said source of fluid pressure and located adjacent the lower side of the doorway for directing a current of fluid in the form of a curtain upwardly and transversely of said doorway, an offtake hood located above the doorway for removing the fluid discharged from the vent and the air escaping from the oven through the upper section of the doorway, and means for producing a discharge of air through said vent coincident with opening the door.

3. The combination with a bake oven having a doorway extending between its interior and exterior and a door movable to open and close said doorway, of a blower, an air-chest connected with said blower and located adjacent the lower side of the doorway, a vent in said air-chest for directing a current of air upwardly in the form of a curtain adjacent the entrance of said doorway, an offtake hood located above the doorway for removing the air discharged from the vent and the air escaping from the oven through the upper section of the doorway and means controlled by the opening and closing of the door to render said blower operative or inoperative.

PAUL JACKSON.
ARTHUR B. CADY.